No. 861,046. PATENTED JULY 23, 1907.
C. U. E. NORUM.
KNOCKDOWN FLOWER POT.
APPLICATION FILED NOV. 22, 1906.
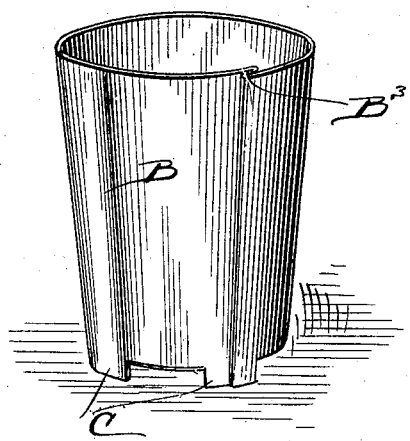
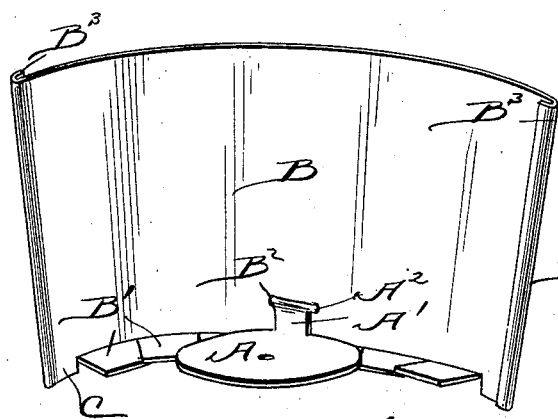
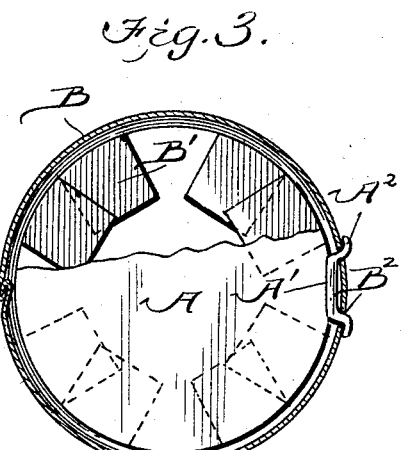
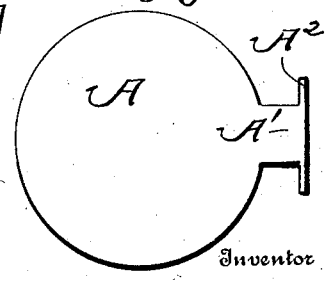

UNITED STATES PATENT OFFICE.

CARL ULRIK ELEF NORUM, OF HUBBELL, MICHIGAN.

KNOCKDOWN FLOWER-POT.

No. 861,046.　　　Specification of Letters Patent.　　　Patented July 23, 1907.

Application filed November 22, 1906. Serial No. 344,638.

*To all whom it may concern:*

Be it known that I, CARL ULRIK ELEF NORUM, a citizen of the United States, residing at Hubbell, in the county of Houghton and State of Michigan, have invented a new and useful Improvement in Knockdown Flower-Pots, of which the following is a specification.

This invention relates to a knockdown flower pot which can be shipped flat and which will be found useful for transplanting plants as it can be very readily removed from around the earthen mold in which the plants are set.

The invention consists of the novel features of construction hereinafter set forth, pointed out in the claims, and shown in the accompanying drawings, in which—

Figure 1 is a perspective view of a flower pot; Fig. 2 is a perspective view showing the flower pot partially opened; Fig. 3 is a horizontal section taken through the flower pot, the bottom being partly broken away; Fig. 4 is a view of the blank from which the pot is made; Fig. 5 is a view of the blank forming the bottom of the pot.

As shown in the accompanying drawing the pot is provided with a bottom A which is circular in form and is provided upon one side with a projecting lug A', which in turn is provided with lateral fingers A².

The sides of the flower pot are formed by a sheet of flexible material B which may be of zinc, tin or other suitable metal, or of any material which will answer the purpose and which can be conveniently bent into a cylindrical form. The lower edge of the blank B is provided with a plurality of tongues B' arranged in pairs and about midway the length of the blank and adjacent the lower edge are formed two openings B². In use the ends of the blank B are bent over oppositely as shown at B³.

The parts are readily shipped flat and when desired for use the blank B which forms the sides of the pot is rolled into a cylinder and the ends B³ engaged so as to lock the same in cylindrical form, and the tongues B' are bent inwardly to form horizontal supports for the circular bottom A. The bottom A is locked in position by bending the lug A' upwardly at a right angle to the said bottom, and the fingers A² are passed through the openings B² and bent to engage the sides B, as shown in Fig. 3. When the tongues B' have been bent upwardly and inwardly to support the bottom A, the intermediate marginal portions of the side B along the lower edge form supporting foot portions C which serve to slightly elevate the bottom A above the ground.

When it is desired to remove the plants it is only necessary to unfasten the ends of the sides B by disengaging them and the said sides can be straightened out, thus leaving the mold entirely free.

Having thus described my invention what I claim as new and desire to secure by Letters Patent is—

1. A flower pot comprising a detachable circular bottom having a lug projecting from one side and fingers carried by the lug, a side piece of flexible material having its end portions adapted to engage each other and to lock the sides of the pot in cylindrical form, and tongues carried by the lower edge of the said sides adapted to support the bottom, the said sides having openings adapted to receive the fingers of the lug.

2. A flower pot consisting of a cylinder, having tongues formed at its lower edge and extending inwardly and openings above said tongues, of a circular bottom adapted to rest upon said tongues, a lug carried by said bottom and extending upwardly, and fingers carried by the lug adapted to engage the said openings.

CARL ULRIK ELEF NORUM.

Witnesses:
　FRANK BEILMAN,
　WISE BENSON.